Sept. 28, 1937. T. A. BRYSON 2,094,058
APERIODIC MOUNTING FOR CENTRIFUGAL SEPARATORS
Filed Nov. 3, 1934

INVENTOR
TANDY A. BRYSON
BY
ATTORNEYS

Patented Sept. 28, 1937

2,094,058

UNITED STATES PATENT OFFICE 2,094,058

APERIODIC MOUNTING FOR CENTRIFUGAL SEPARATORS

Tandy Arnold Bryson, Troy, N. Y., assignor, by mesne assignments, to American Machine and Metals, Inc., New York, N. Y., a corporation of Delaware Application November 3, 1934, Serial No. 751,411

10 Claims. (Cl. 308—143)

My invention relates to centrifugal separators and particularly to a means for eliminating gyroscopic sail or precession in a device of this character without creating undue resistance to "whip" oscillation.

My invention includes the novel elements and the combinations and arrangements thereof described below and illustrated in the accompanying drawing in which—

Figure 1:
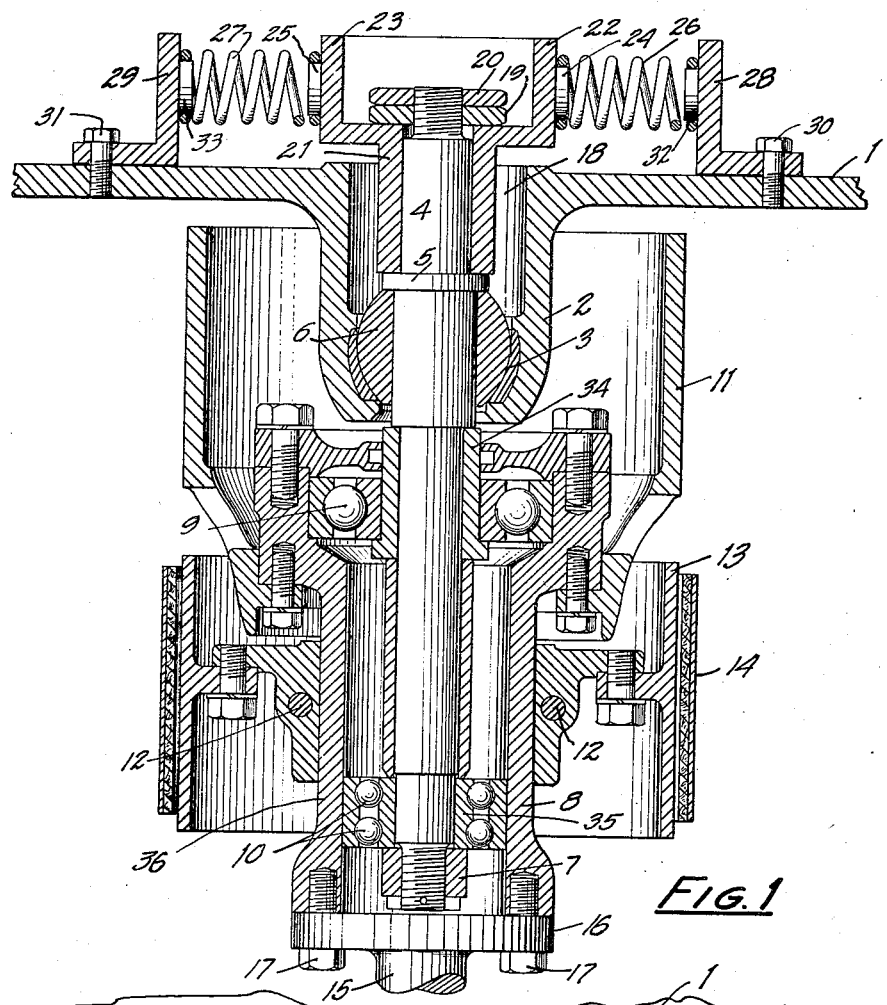
Figure 2:
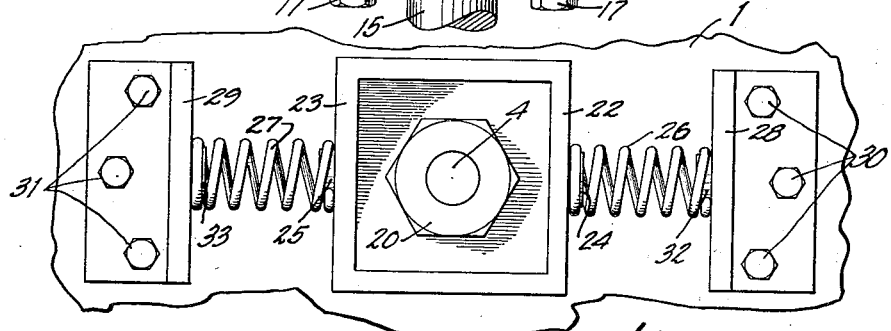

Fig. 1 is a vertical section through the bearing and support for the basket, and showing the application of my invention; and Fig. 2 is a fragmentary plan view of the device.

The objects and advantages of the invention will be understood from a reading of the description in connection with the accompanying drawing.

1 is a stationary hanger bracket from which the centrifugal machine is suspended. This bracket is provided with a depending portion 2 having a socket 3 formed in the interior thereof for a ball and socket joint. 4 is a non-rotating stub shaft or hanger provided with a collar 5 adapted to rest on top of the ball 6 fitted in the socket 3.

Secured to the hanger 4, by means of a nut 7 at the bottom thereof, is a bearing, indicated generally at 8, and containing ball bearings 9 and 10. This bearing comprises inner stationary sleeves 34 and 35 secured to the hanger and an outer rotatable element 36 forming a housing for the bearing assembly. Secured to the rotatable element 36 is the pulley 11 adapted to receive a driving belt. Also secured thereto by suitable means, such as clamp screws 12, is a brake drum 13 around which is a contractible brake band 14. Secured to the bottom of the element 36 by cap screws 17 is a spindle 15 which rotates therewith and supports the basket in the usual manner.

In the operation of a centrifugal extractor it is generally impossible so to place the load in the basket that its center of mass will lie upon the spindle axis. Because a rotating body not affected by external force will spin about an axis passing through its center of mass, it is usual, for the purpose of reducing the reactive effect upon the spindle and bearings of external forces tending to prevent the mass from spinning about that axis, to provide a bearing or support therefor having a high degree of flexibility and which will impose little restraint upon the "whipping" motion of the spindle which occurs when it rotates on an axis not coincident with its geometric axis. For this reason, the basket and bearing housing are pendulously supported from bracket 1 and may swing about the center of the ball and socket joint in any direction.

When the basket is stationary, the spindle is of course vertical, and if it is deflected from its vertical position it will tend to swing back and forth as an ordinary pendulum. However, when the basket is spinning rapidly and the spindle is acted upon by an external force tending to deflect it from a vertical position, it will not swing directly back but will actually move at right angles to the force which tends to restore it to its normal position. For this reason the spin axis will describe a cone. Since this gyroscopic movement produces an angular change in the position of the spin axis, the gyroscopic torque is increased and the amplitude of sail or precession increases until the machine is wrecked, or until the wide sail causes so much energy to be absorbed in friction of the moving parts that sway energy is dissipated as fast as it is built up.

In machines of the type shown in the drawing this gyroscopic sweep or precession has been controlled heretofore by placing a rubber annulus about the upper end of the stub shaft 4 and between the shaft and the interior of the socket 18 in the bracket. By compressing this rubber annulus between the socket and the shaft by means of nuts such as shown at 19 and 20, the resistance which the annulus offers to pendulous movement of the spindle about the center of the ball and socket joint may be varied. Such a means, however, offers the same resistance to pendulous swing in all directions.

In the present invention I propose to eliminate the rubber annulus heretofore employed and utilize the mechanism described below.

Tightly fitted over the upper portion of the stub shaft 4 is a collar 21 secured in place by nut 19 and lock nut 20. At the upper end of the collar 21 are diametrically opposed portions 22 and 23 extending to the right and left of the collar as viewed in Fig. 1. The collar and these extending portions may be made in the form shown in the drawing if desired. On the exterior of the portions 22 and 23 are small cylindrical projections 24 and 25 respectively adapted to be received within and position helical springs 26 and 27. These springs are compressed between abutments 28 and 29, respectively, secured to the bracket by cap screws 30 and 31, and the abutments are provided with projections 32 and 33, respectively, similar to the projections 24 and 25.

From the foregoing it will be apparent that the springs 26 and 27 offer substantially no resistance to spindle swing in a plane perpendicular to the axis of the springs. On the other hand, substantial resistance is offered to spindle swing in a direction in line with the springs. In other words the resistance offered to oscillation of the pendulum in the one meridian plane differs substantially from the resistance offered in the meridian plane at right angles thereto. Hence, the machine will have different sail frequencies in these different planes.

Since the gyroscopic effect promotes conical pendulum motion at conical pendulum frequencies, it is obvious that the interposition of the springs 26 and 27 in one meridian plane causes the natural period of sail to change four times during one sail cycle. The effect of this is to break up entirely the tendency to sail at any frequency whatever since the inertia of the loaded basket is too great to be quickly accelerated or decelerated within the period of a single sail cycle.

The springs 26 and 27 are preferably exactly alike, but this is not absolutely necessary since two opposed springs will take on the characteristics of a single spring. However, they should be so selected as to provide a substantially faster swing of the basket in line with the springs than at right angles thereto. For example, if the swing at right angles to the springs is twenty per minute the swing in line with the springs may be thirty per minute. Furthermore, the springs, when positioned in place, should be sufficiently compressed so that they may expand to the extent necessary to follow the full movement of the spindle. Generally speaking, provision for a basket movement of one inch in any direction will be adequate.

A centrifugal extractor equipped with my aperiodic mounting is absolutely free from sway during normal operation, and it is impossible to force the spindle by hand (when not rotating) to describe a conical surface in space. Resistance to such motion is solely a matter of timing because it is quite easy to push the spindle in any radial direction and there appears to be very little resistance to that vibration of the spindle which is solely due to its tendency to rotate about an axis passing through the center of mass of the basket and load. By reason of this fact, the stress on the bearing head is reduced to a minimum.

While I have described my invention in its preferred embodiments, it is to be understood that the words which I have used are words of description and not of limitation. Hence, changes within the purview of the appended claims may be made without departing from the true scope and spirit of my invention in its broader aspects.

What I claim is:

1. In an aperiodic mounting for a centrifugal separator, the combination with a rotatable spindle, of means for pendulously supporting said spindle and providing substantially free swinging movement thereof in one meridian plane, and means offering substantial resistance to swinging movement thereof in a meridian plane at right angles to said first plane.

2. In an aperiodic mounting for a centrifugal separator, a spindle, a spindle support adapted to permit the spindle to swing freely in all directions, and means for restraining the freedom of spindle swing in one meridian plane; said spindle having substantially free swinging movement at right angles to said plane.

3. In an aperiodic mounting for a centrifugal separator, a spindle, a bearing therefor, a support for the spindle and bearing adapted to permit the assembly to swing freely in all directions, and means for restraining the freedom of swing in one meridian plane; said spindle having substantially free swinging movement at right angles to said plane.

4. In an aperiodic mounting for a centrifugal separator, a spindle, a spindle support adapted to permit the spindle to swing freely in all directions, and yielding means for restraining the freedom of spindle swing in one meridian plane; said spindle having substantially free swinging movement at right angles to said plane.

5. In an aperiodic mounting for a centrifugal separator, a spindle, a spindle support adapted to permit the spindle to swing freely in all directions, and resilient means for restraining the freedom of spindle swing in one meridian plane; said spindle having substantially free swinging movement at right angles to said plane.

6. In an aperiodic mounting for a centrifugal separator, a spindle, a bearing therefor, a support for the spindle and bearing adapted to permit the assembly to swing freely in all directions, and yielding means for restraining the freedom of swing in one meridian plane; said spindle having substantially free swinging movement at right angles to said plane.

7. In an aperiodic mounting for a centrifugal separator, a spindle, a bearing therefor, a support for the spindle and bearing adapted to permit the assembly to swing freely in all directions, and resilient means for restraining the freedom of swing in one meridian plane; said spindle having substantially free swinging movement at right angles to said plane.

8. In an aperiodic mounting for a centrifugal separator, the combination with a rotatable spindle, of means for pendulously supporting said spindle, and means cooperating with said spindle for generally restraining the swinging movement thereof while permitting substantially free swinging movement in one meridian plane.

9. An aperiodic mounting for a centrifugal separator comprising a spindle, means for pendulously supporting said spindle, and means cooperating with said spindle providing maximum resistance to swinging movement thereof in one meridian plane and a progressively decreasing resistance in all meridian planes between said one meridian plane and a meridian plane at right angles thereto in which the resistance is substantially zero.

10. An aperiodic mounting for a centrifugal separator comprising a spindle, means for pendulously supporting said spindle, and opposed springs cooperating with said spindle and said support to restrain the swinging movement of said spindle; the swinging movement of said spindle in a plane at right angles to the axes of said springs being substantially free.

TANDY A. BRYSON.